United States Patent
Sadeghian Marnani et al.

(10) Patent No.: US 11,940,416 B2
(45) Date of Patent: Mar. 26, 2024

(54) HETERODYNE SCANNING PROBE MICROSCOPY METHOD AND SYSTEM

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Maarten Hubertus van Es, Voorschoten (NL); Paul Louis Maria Joseph van Neer, Bergschenhoek (NL); Rutger Meijer Timmerman Thijssen, Loosdrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 349 days.

(21) Appl. No.: 16/093,285

(22) PCT Filed: Apr. 13, 2017

(86) PCT No.: PCT/NL2017/050228
§ 371 (c)(1),
(2) Date: Oct. 12, 2018

(87) PCT Pub. No.: WO2017/179978
PCT Pub. Date: Oct. 19, 2017

(65) Prior Publication Data
US 2019/0204276 A1    Jul. 4, 2019

(30) Foreign Application Priority Data
Apr. 14, 2016  (EP) .................................. 16165292

(51) Int. Cl.
*G01N 29/06*  (2006.01)
*G01N 29/24*  (2006.01)
(Continued)

(52) U.S. Cl.
CPC ..... *G01N 29/0681* (2013.01); *G01N 29/2406* (2013.01); *G01N 29/2418* (2013.01);
(Continued)

(58) Field of Classification Search
CPC ........... G01N 29/0681; G01N 29/2406; G01N 29/2418; G01N 29/346; G01N 29/4436; G01Q 60/32; G01Q 60/34
(Continued)

(56) References Cited

U.S. PATENT DOCUMENTS 6,006,593 A * 12/1999 Yamanaka ............. G01Q 60/32
                                                                73/105
9,134,341 B2 * 9/2015 Prater ..................... G01Q 30/02
(Continued)

FOREIGN PATENT DOCUMENTS

| EP | 1411341 A1 | 4/2004 |
| EP | 3349017 A1 * | 7/2018 | ......... G01N 29/0681 |
| EP | 3349018 A1 * | 7/2018 | ......... G01N 29/0681 |

OTHER PUBLICATIONS

Rouzic et al., "W-Shaped Cantilevers for Scanning Force Microscopy," IEEE Sensors Journal, vol. 13, No. 4, pp. 1340-1346, XP011494244 (Apr. 1, 2013).
(Continued)

*Primary Examiner* — Daniel S Larkin
*Assistant Examiner* — Nashmiya S Fayyaz
(74) *Attorney, Agent, or Firm* — Leydig, Voit & Mayer, Ltd.

(57) ABSTRACT

The present invention relates to a heterodyne scanning probe microscopy method for imaging structures on or below the surface of a sample, the method including applying, using a transducer, an acoustic input signal to the sample sensing, using a probe including a probe tip in contact with the surface, an acoustic output signal, wherein the acoustic
(Continued)

output signal is representative of acoustic surface waves induced by the acoustic input signal wherein the acoustic input signal comprises at least a first signal component having a frequency above 1 gigahertz, and wherein for detecting of the acoustic output signal the method comprises a step of applying a further acoustic input signal to at least one of the probe or the sample for obtaining a mixed acoustic signal, the further acoustic input signal including at least a second signal component having a frequency above 1 gigahertz, wherein the mixed acoustic signal comprises a third signal component having a frequency equal to a difference between the first frequency and the second frequency, wherein the frequency of the third signal component is below 1 gigahertz.

14 Claims, 5 Drawing Sheets

(51) Int. Cl.
*G01N 29/34* (2006.01)
*G01N 29/44* (2006.01)
*G01Q 60/32* (2010.01)
*G01Q 60/34* (2010.01)

(52) U.S. Cl.
CPC ....... *G01N 29/346* (2013.01); *G01N 29/4436* (2013.01); *G01Q 60/32* (2013.01); *G01Q 60/34* (2013.01)

(58) Field of Classification Search
USPC .................................................. 73/105, 606
See application file for complete search history.

(56) References Cited

U.S. PATENT DOCUMENTS

| | | |
|---|---|---|
| 2006/0037401 A1 | 2/2006 | Shekhawat et al. |
| 2008/0276695 A1 | 11/2008 | Prater et al. |
| 2008/0295584 A1* | 12/2008 | Cantrell ................ G01Q 60/32 73/105 |
| 2015/0330951 A1 | 11/2015 | Gordon et al. |

OTHER PUBLICATIONS

Nievergelt et al., "High-Frequency Multimodal Atomic Force Microscopy," Bellstein Journal of Nanotechnology 2014, 5. pp. 2459-2467 (2014).

Hu et al., "Imaging of Subsurface Structures Using Atomic Force Acoustic Microscopy at GHz Frequencies," AIP Journal of Applied Physics 109, 084324, pp. 1-6 (2011).

Sarajlic et al., "A Novel Electrostatically Actuated AFM Probe for Vibro-Flexural Mode Operation," SmartTip B.V., Enschede, The Netherlands, 4 pages (1996).

Hesjedal, "Surface Acoustic Wave-Assisted Scanning Probe Microscopy—A Summary," IOP Publishing, Reports on Progress in Physics 73, 016102, (2010) (42 pages).

European Patent Office, Extended European Search Report in corresponding European Application No. 16165292.0, dated Sep. 30, 2016 (7 pages).

* cited by examiner

HETERODYNE SCANNING PROBE MICROSCOPY METHOD AND SYSTEM

CROSS-REFERENCE TO RELATED APPLICATIONS

This patent application is a U.S. National Phase of PCT International Application No. PCT/NL2017/050228, filed Apr. 13, 2017, which claims priority to European Application No. 16165292.0, filed Apr. 14, 2016, which are both expressly incorporated by reference in their entireties, including any references contained therein.

FIELD OF THE INVENTION

The present invention is directed at a heterodyne scanning probe microscopy method for imaging structures on or below the surface of a sample, the method including: applying, using a transducer, an acoustic input signal to the sample; and sensing, using a probe including a probe tip in contact with the surface, an acoustic output signal, wherein the acoustic output signal is representative of acoustic waves induced by the acoustic input signal that are measurable at the surface. The invention is further directed at a scanning probe microscopy system for imaging structures on or below the surface of a sample, comprising a probe for scanning the sample surface, wherein the probe comprises a probe tip mounted on a cantilever, and wherein the probe is mounted on a sensing head arranged for bringing the probe tip in contact with the sampling surface, the system further comprising a motion actuator for enabling motion of the probe relative to the sample, a transducer for applying an acoustic input signal to the sample, and a probe deflection sensor for producing a sensor signal indicative of an acoustic output signal received via the probe tip, wherein the acoustic output signal is representative of acoustic waves induced by the acoustic input signal that are measurable at the surface. Moreover, the invention is directed at a probe comprising a probe tip and a cantilever, for use in a system or method as defined above.

BACKGROUND

Acoustic scanning probe microscopy methods, such as ultrasonic atomic force microscopy (UAFM), form a class of imaging and research methods that allows the accurate imaging of sub-surface features in a sample, i.e. on or below the surface of the sample. To perform these methods, an acoustic signal is applied to the sample, either via the surface, via a backside of the sample (i.e. the side opposite the sample surface contacted to the probe), from aside or via any other portion of the sample. Other than standard scanning probe microscopy (SPM) methods, the acoustic SPM methods are not based on mapping the surface topology using force or amplitude feedback. Instead, the acoustic signal applied to the sample results in the manifestation of acoustic waves at the sample surface that allow determination and mapping of the local elastic properties, which to some extent causes internal structures within the sample to become detectable.

Existing methods of this type for example include ultrasonic atomic force microscopy. Despite the potential of this technology, the ever decreasing size of semiconductor elements and ongoing progress of technology create the need to even further increase the resolution of these imaging techniques. Moreover, also the contrast provided by existing methods requires improvement in order to enable application for these purposes.

SUMMARY OF THE INVENTION

It is an object of the present invention to provide a scanning probe microscopy method and system, and means therefore, that overcomes the disadvantages of existing systems and allows for high resolution imaging of sub-surface structures with good contrast and detection of structures of very small size.

To this end, there is provided herewith a heterodyne scanning probe microscopy method for imaging structures on or below the surface of a sample, the method including: applying, using a transducer, an acoustic input signal to the sample; sensing, using a probe including a probe tip in contact with the surface, an acoustic output signal, wherein the acoustic output signal is representative of acoustic waves arriving at the surface induced by the acoustic input signal; wherein the acoustic input signal comprises at least a first signal component having a frequency above 1 gigahertz, and wherein for detecting of the acoustic output signal the method comprises a step of: applying a further acoustic input signal to at least one of the probe or the sample for obtaining a mixed acoustic signal, the further acoustic input signal including at least a second signal component having a frequency above 1 gigahertz, wherein the mixed acoustic signal comprises a third signal component having a frequency equal to a difference between the first frequency and the second frequency, wherein the frequency of the third signal component is below 1 gigahertz.

The use of an acoustic input signal within a frequency range above 1 gigahertz (GHz) improves the resolution and contrast of acoustic scanning probe microscopy methods (i.e. also referred to as scanning acoustic microscopy (SAM)) in a number of situations. It has been found that, for acoustic scanning probe microscopy methods with acoustic input signals at lower frequency ranges (e.g. up to 100 MHz) the transfer mechanism from input to output signal is primarily governed by mechanical characteristics, enabling determination of local elastic properties. However, at higher acoustic frequencies, e.g. for the acoustic input signals having frequencies above 1 GHz, internal scattering of the signals at structures, density variations and material differences within the sample also significantly affects the transfer function from input to output, and thereby the acoustic output signal. For example, the occurrence of scattering causes the output signal to carry information on the depth of structures below the surface, and enables structures that are arranged deeper below the surface to become detectable (as compared to measurement at frequencies below 100 MHz). The present invention benefits from this by providing improved accuracy, resolution and contrast with respect to detection of subsurface structures.

The term 'acoustic' as applied herein, although this term is generally well understood by the skilled person, is to be interpreted in accordance with it's normal meaning known to the skilled person as referring to waves or signals of mechanical nature (e.g. continuous displacements of periodic nature for a certain duration of time, i.e. a vibration). An acoustic input signal is thus a mechanical wave or a vibration characterized by its signal characteristics (amplitude, frequency, etc.). The signal may consist of one or more signal components having different signal component characteristics.

For example, consider that the speed of sound in many solid materials at 20° C. typically ranges between 2500 m/s and 6500 m/s (for longitudinal waves). Assuming as a typical value a material having a speed of sound of $5*10^3$ m/s, an acoustic wave of 1 GHz will have a wavelength of $5*10^{-6}$ meter, i.e. 5 micrometer. Thus, the diffraction limit in this material allows sub-surface structures larger than 5 micrometer to be resolvable with an acoustic input signal of 1 GHz. The diffraction limit decreases further at even higher frequencies and in materials with wherein the speed of sound is smaller. For example, with an acoustic input signal of 10 GHz, sub-surface structures larger than 500 nanometer become detectable; moreover, with an acoustic input signal of 50 GHz, sub-surface structures larger than 100 nanometer become detectable; and with an acoustic input signal of 100 GHz, sub-surface structures larger than 50 nanometer become detectable. In theory, the frequency may be even larger than that. For example, at 1 terahertz (THz), sub-surface structures larger than 5 nanometer become detectable.

The present invention is further based on the insight that sensing of waves at these frequencies is problematic with a scanning probe microscopy system already for acoustic waves above 1 MHz. The present invention overcomes this by applying a heterodyne measurement technique. In essence, by applying a further acoustic input signal having a frequency $f_2$ that is slightly offset from the frequency $f_1$ of the (first) acoustic input signal, a mixed signal may be obtained therefrom comprising frequency components at the difference frequency $|f_2-f_1|$ and at the superposed frequency $(f_1+f_2)$. The former of these components, the component at the difference frequency $|f_2-f_1|$, becomes well measurable if the offset between both frequencies becomes small enough. The acoustic input signal that induces the acoustic waves, will diffract upon encountering a sub-surface structure. Therefore, by accurate tuning of both frequencies $f_1$ and $f_2$, the diffraction affected acoustic signal conveyed in the acoustic output signal becomes measurable by analyzing the signal component at the difference frequency $|f_2-f_1|$, even for the acoustic signals in the range above 1 GHz. Hence, this allows the sub-surface structures at micrometer and nanometer scale to become visible, enabling imaging thereof using the method of the present invention.

As a further important advantage of the application of a heterodyne measurement technique in accordance with the invention is that this allows the measurement of both phase and amplitude. In this respect, the method distinguishes from homodyne methods applying an amplitude modulated input signal, which allow measurement of amplitude only. The combination of measuring both phase and amplitude enables improvement of the detectability of subsurface structures, as it enables to distinguish between different material compositions and to extract depth information.

To understand the principles of the invention, it is important to realize that the adding of the both acoustic input signals as such is not sufficient to obtain a signal component at the difference frequency, as desired. The desired frequency component finds its origin in mixing due to the interaction between the sample surface and the probe tip, which has a non-linear character. This is due to the fact that this interaction is governed by the (non-linear) van der Waals and repulsive forces between atoms at the sample surface and atoms forming the probe tip, characterized by their Lennard-Jones potential. The output signal measured using the probe tip therefore contains the desired signal component at the difference frequency.

In accordance with some embodiments the further acoustic input signal applied to the at least one of the probe or the sample for obtaining the mixed acoustic signal, is applied by inducing acoustic vibrations in the probe tip of the probe. In order to obtain the mixed acoustic signal, it is not required to perform the mixing within the sample to be examined. Although, in accordance with some embodiments, mixing within the sample of the acoustic input signal and the further acoustic input signal may be applied, an even better signal-to-noise ratio may be obtained by providing the further acoustic input signal via the probe tip of the scanning probe microscopy system. In accordance with these embodiments of the present invention, the further acoustic input signal may be applied via the probe tip because of the fact that proper shaping of the probe tip provides the probe tip to be responsive to a plurality of frequencies (rather then having a particular resonance frequency). For example, applying a cone shaped or pyramid shaped probe tip allows stimulation of the probe tip to such an extent that the further acoustic input signal may be applied via the tip. Of course, preferably, the acoustic input signal should be applied in such a manner that the acoustic properties of the probe tip are not negatively affected by the excitation process. The cantilever, on the other hand, due to its shape does have resonance frequencies that limit the possibility of applying the further acoustic input signal via the cantilever. This insight is in particular useful to the embodiments of the present invention wherein the acoustic signals applied have frequencies in a range above 1 GHz (gigahertz) which is far above the typical resonance frequencies of a cantilever.

In accordance with some embodiments, the step of inducing the acoustic vibrations in the probe tip is performed by using an optical excitation beam incident on the probe tip, the optical excitation beam having a time varying optical power for enabling photothermal excitation of the probe tip for inducing the acoustic vibrations. An optical excitation beam may consist of a laser (or other) optical beam having a variable intensity. The intensity of the beam or the power of the beam may be varied at the excitation frequency, i.e. the frequency of the further acoustic input signal to be applied. Thermal effects in the probe tip will cause the probe tip to start vibrating the with the frequency applied via the optical excitation beam. This can be used for applying the further acoustic vibration signal to the probe tip for mixing it with the acoustic signal applied via the sample and obtaining the desired difference frequency signal component from the tip-surface interactions.

In accordance with some specific embodiments, the step of sensing the acoustic output signal is performed by making an optical sensing beam incident on the probe tip and sensing a reflected beam of the optical sensing beam using an optical sensor, wherein the optical sensing beam is formed by said optical excitation beam. As may be appreciated, in scanning probe microscopy, the probe movements are sensed using an incident optical beam that is reflected at the probe tip and detected by an optical sensor. The motion of the probe tip results in a variation of the reflection angle of the beam, which results in a variation of the location of the reflected beam on the optical sensor. This variation on the optical sensor can be detected and analyzed as being the output signal of the system. In the present embodiments, the optical excitation beam which is incident on the probe tip is used as the optical sensing beam, by sensing the reflection of the optical excitation beam by the optical sensor of the system.

In accordance with some further embodiments, the step of inducing the acoustic vibrations in the probe tip is performed by electrostatic excitation of the probe tip, by applying an electric signal to the probe tip, the electric signal having a time varying voltage for inducing the acoustic vibrations in the probe tip. Electrostatic excitation of the probe tip provides an alternative way of providing the further acoustic input signal via the probe tip. The probe tip for example may be stimulated by applying a variable electric signal have a time varying voltage, thereby resulting in a time varying electrostatic field which results in a vibration of the probe tip. By varying the time varying voltage at a frequency identical to the desired frequency of the further acoustic input signal, a vibration of the probe tip at this frequency is obtained which can be mixed with the acoustic input signal applied via the sample.

In accordance with yet another embodiment of the present invention the step of sensing the acoustic output signal comprises providing a sensor signal using a sensor, the method further comprising a step of analyzing the sensor signal by comparing the sensor signal with a reference signal, wherein the reference signal is formed by mixing the acoustic input signal with the further acoustic input signal for obtaining the reference signal including a reference signal component having a frequency equal to a difference between the first frequency and the second frequency. The heterodyne method of the present invention, for analyzing the frequency component of the output signal at the different frequency $|f_2-f_1|$ can be analyzed by forming the different frequency components by mixing the acoustic input signal and the further acoustic input signal without applying them to the sample or the probe tip.

In accordance with yet a further aspect of the present invention scanning probe microscopy system for imaging structures on or below the surface of a sample, comprising a probe for scanning the sample surface, wherein the probe comprises a probe tip mounted on a cantilever, and wherein the probe is mounted on a sensing head arranged for bringing the probe tip in contact with the sampling surface, the system further comprising a motion actuator for enabling motion of the probe relative to the sample, a transducer for applying an acoustic input signal to the sample, and a probe deflection sensor for producing a sensor signal indicative of an acoustic output signal received via the probe tip, wherein the acoustic output signal is representative of acoustic waves induced by the acoustic input signal; wherein transducer is arranged for producing the acoustic input signal such as to comprise at least a first signal component having a frequency above 1 gigahertz, and wherein the system is further configured for applying a further acoustic input signal to at least one of the probe or the sample for obtaining a mixed acoustic signal, the further acoustic input signal including at least a second signal component having a frequency above 1 gigahertz, wherein the mixed acoustic signal comprises a third signal component having a frequency equal to a difference between the first frequency and the second frequency, wherein the frequency of the third signal component is below 1 gigahertz.

The probe deflection sensor may comprise an optical source arranged for producing an optical sensing beam and for directing the optical sensing beam to the probe tip, and an optical sensor arranged for receiving a reflected beam obtained by reflection of the optical sensing beam by the probe tip. However, any suitable type of probe deflection sensor may be applied. Alternative sensing techniques for example include the application of a piezo-resistive layer, the electrical resistance of which varies with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample. The skilled person will be familiar with such techniques and is able to apply them in embodiments of the present invention.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

The present invention relates to scanning probe microscopy, in particular heterodyne force microscopy.

Scanning probe microscopy is a highly accurate method of imaging nanostructures on the surface of a sample by scanning a probe with a probe tip across the sample surface, while keeping the probe tip in contact with the surface (contact mode) or vibrating the probe tip such as to tap the probe tip in contact with the surface during each cycle of vibration (tapping mode). As a skilled person will appreciate, other sensing modes are available for performing scanning probe microscopy, which are not further discussed here but which are known to the skilled person. In regular scanning probe microscopy methods, such as atomic force microscopy, only the nanostructures on the surface of the substrate are visualized. Because in principle the scanning probe microscope allows scanning across any desired distance, the accuracy can be obtained across any desired range of dimensions.

In a number of fields of application of scanning probe microscopy, it is however not only desired to visualize structures that are present on the surface of the substrate. For example, in the semiconductor industry, there is an interest in visualizing structures that are present below the surface of the substrate, because for example device layers may be covered underneath other device layers of a semiconductor device. The present invention is directed to heterodyne force microscopy, which provides a sensing method that allows the visualization of sub-surface structures. In heterodyne force microscopy, an acoustic signal is applied to the sample which creates acoustic surface waves at the surface of the substrate. The acoustic signal is mixed with a further signal that is applied to the sample, and the probe tip of the scanning probe microscopy system is scanned across the surface. Vibrations that are picked up by the probe tip from the surface are picked up by means of an optical sensor, often consisting of a laser beam that impinges on the cantilever of the probe and reflects onto an optical detector. The output signal is analyzed using an analysis system for providing information about any subsurface structures present underneath the surface of the sample.

Typically, the acoustic input signals applied in conventional methods comprise signal components within the range of 100 kHz to 10 MHz. Increasing the frequency comes at the cost of deteriorated coupling between the transducer and the sample. The thickness of a coupling medium to be applied between the transducer and the sample (e.g. a grease or liquid or other means) necessarily must be thinner at higher frequencies, to reduce signal loss due to deteriorated coupling. Likewise, also at the probe tip, through which the acoustic output signal must be received by the probe, the coupling problem becomes worse at higher frequencies. The frequency range for the input signal is therefore limited. The invention applies heterodyne sensing to enable detection at high acoustic frequencies, e.g. applying acoustic signals of 1 GHz and above. This enables the detection of phase and amplitude characteristics and variations in the acoustic input signal through down-conversion of the frequency by applying a further acoustic input signal at a slightly difference frequency. The down-converted signal at the different frequency $|f_2-f_1|$ is present as a signal component in the mixed acoustic signal obtained, and can be analyzed to detect these phase and amplitude characteristics.

Figure 1:
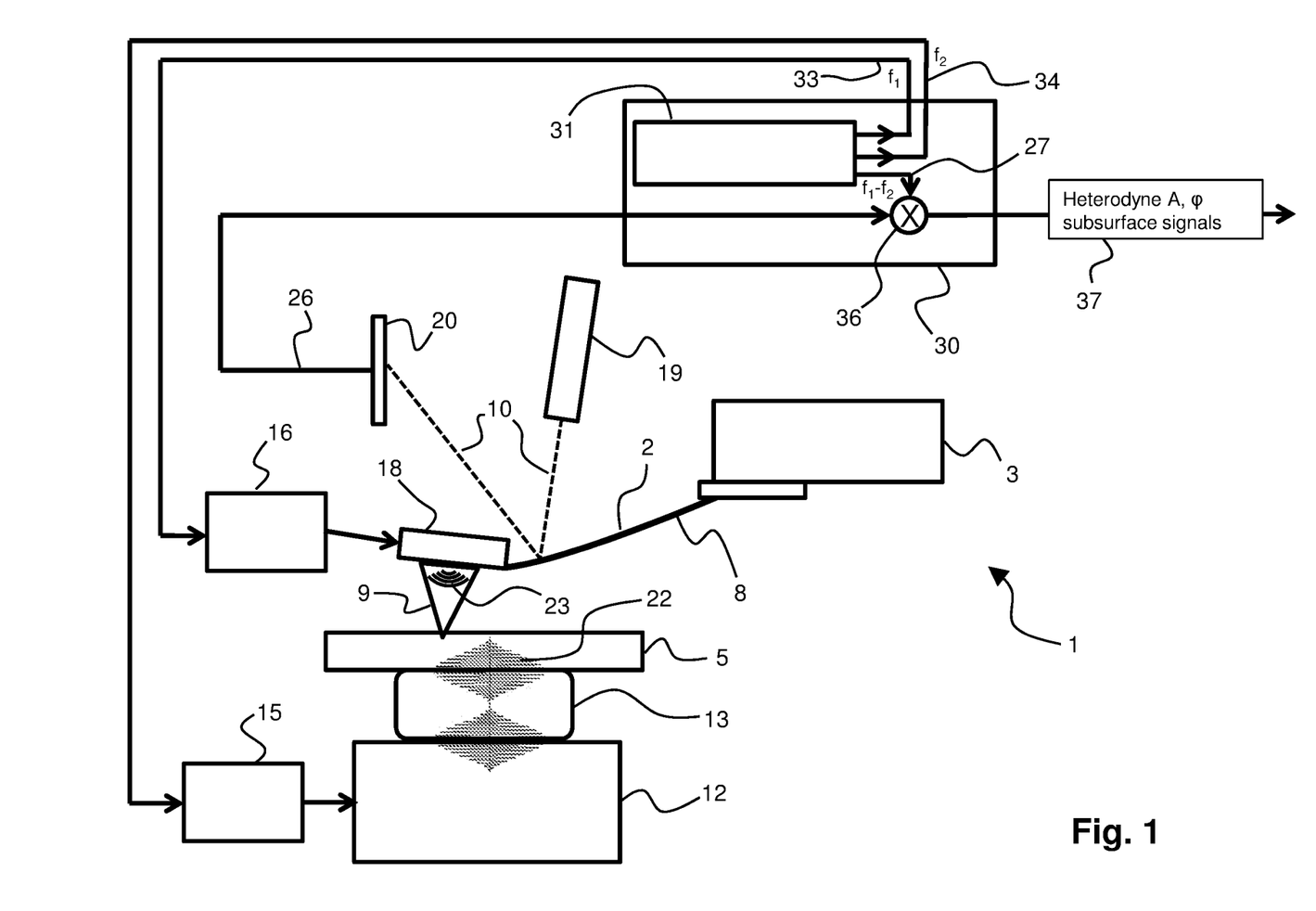
FIG. 1 schematically illustrates a scanning probe microscopy system in accordance with the present invention.

FIG. 1 schematically illustrates a scanning probe microscopy system 1 in accordance with an embodiment of the present invention. In the system 1, a probe 2 is attached to a scan head 3. The scan head 3 enables scanning of the probe 2 relative to the surface of a sample 5. The probe 2 consists of a cantilever 8 and a probe tip 9. During scanning, the probe tip 9 is brought in contact with the surface of the sample 5. For example the probe tip 9 may be scanned across the surface of the sample 5 in contact mode (continuous contact between the probe tip 9 and the surface of the sample 5) or tapping mode (periodic contact between the probe tip 9 and the surface of the sample 5 during each cycle of a vibration applied to the cantilever 8). A laser unit 19 provides a laser beam 10 that impinges on the cantilever 8 and reflects towards an optical detector 20. Using the optical detector 20, vibrations in the cantilever 8 can be sensed due to small deflections of the reflected beam 10 under influence of such vibrations. This provides an output signal 26 for further analysis.

In accordance with the present invention, a generator 31 provides a first input signal 33 and a second input signal 34. The first input signal 33 is periodic with a frequency $f_1$, and the second input signal 34 is a periodic signal with a frequency $f_2$. The frequencies $f_1$ and $f_2$ are both above 1 gigahertz (GHz). For example, these signals may range anywhere above 1 GHz, e.g. 10 GHz or 20 GHz. Characteristic for the frequencies $f_1$ and $f_2$ of the input signals 33 and 34 is that the difference between $f_1$ and $f_2$ is below 1 GHz.

In accordance with the present invention, both the first input signal 33 and the second input signal 34 are converted into an acoustic signal to be applied during scanning. In the embodiment of FIG. 1, a transducer unit 18 is in contact with a probe tip 9, and receives the input signal 33 that is amplified using power amplifier 16. The transducer 18 converts the input signal 33 to an acoustic signal 23 applied to the probe tip 9. Moreover, the second input signal 34 is amplified in power amplifier 15 and provided to transducer 12 underneath the sample 5. A coupling medium 13 (e.g. water) provides for acoustic coupling between the transducer 12 and the sample 5. The second input signal 34 amplified using power amplifier 15 is converted into an acoustic signal 22 to be applied via the coupling medium 13 to the sample 5. This creates acoustic waves on the surface of the sample 5 that can be picked up by the probe tip 9 when it is in contact with the surface of the sample 5. The both acoustic signals 22 and 23 will result in a mixed signal in the probe 2. The mixed signal comprises both frequency components $f_1$ and $f_2$, as well as a high frequency component $f_{high}=f_1+f_2$ and a differential frequency component $f_{diff}=|f_1-f_2|$. In particular the differential frequency $f_{diff}$ is lower than 1 GHz as it represents the difference between the frequencies $f_1$ and $f_2$. Therefore, carefully selecting the frequencies $f_1$ and $f_2$ close to each other will provide a differential frequency component $f_{diff}$ having a frequency sufficiently below 1 GHz that can be sensed via the cantilever 8. As will be appreciated, this differential frequency $f_{diff}$ must be in a range that is below a cut-off frequency characteristic for the cantilever to be picked up via the cantilever as is illustrated in FIG. 1. If this is not the case, then alternatively the differential frequency component may be picked up via the probe tip 9.

As will be appreciated, any information on sub-surface structures will at least be present in the acoustic input signal 22. By mixing the two acoustic signals 22 and 23, this information is also present in the signal component at the differential frequency $f_{diff}$, which therefore becomes measurable if the frequencies $f_1$ and $f_2$ are selected to be close to each other to provide a small enough $f_{diff}$. Therefore, the output signal 26 contains the information on sub-surface structures. This output signal 26 is provided to the analysis system 30. In the analysis system 30, the output signal 26 is compared with a reference signal 27. The reference signal 27 is created by analyzing the first and second input signal 33 and 34 e.g. by digital analysis for determining their difference frequency, and generating a reference signal having a frequency component $|f_1-f_2|$. The comparison between reference 27 and output signal 26 is represented by element 36 in FIG. 1, and at the output of the analysis system 30, there is provided an output signal 37 comprising the amplitude $A(x, y)$ and $\varphi(x, y)$ of the output signal 26 from the optical detector 20. By mapping these location dependent amplitude and phase signals, sub-surface structures may be visualized in accordance with the present invention.

Figure 2:
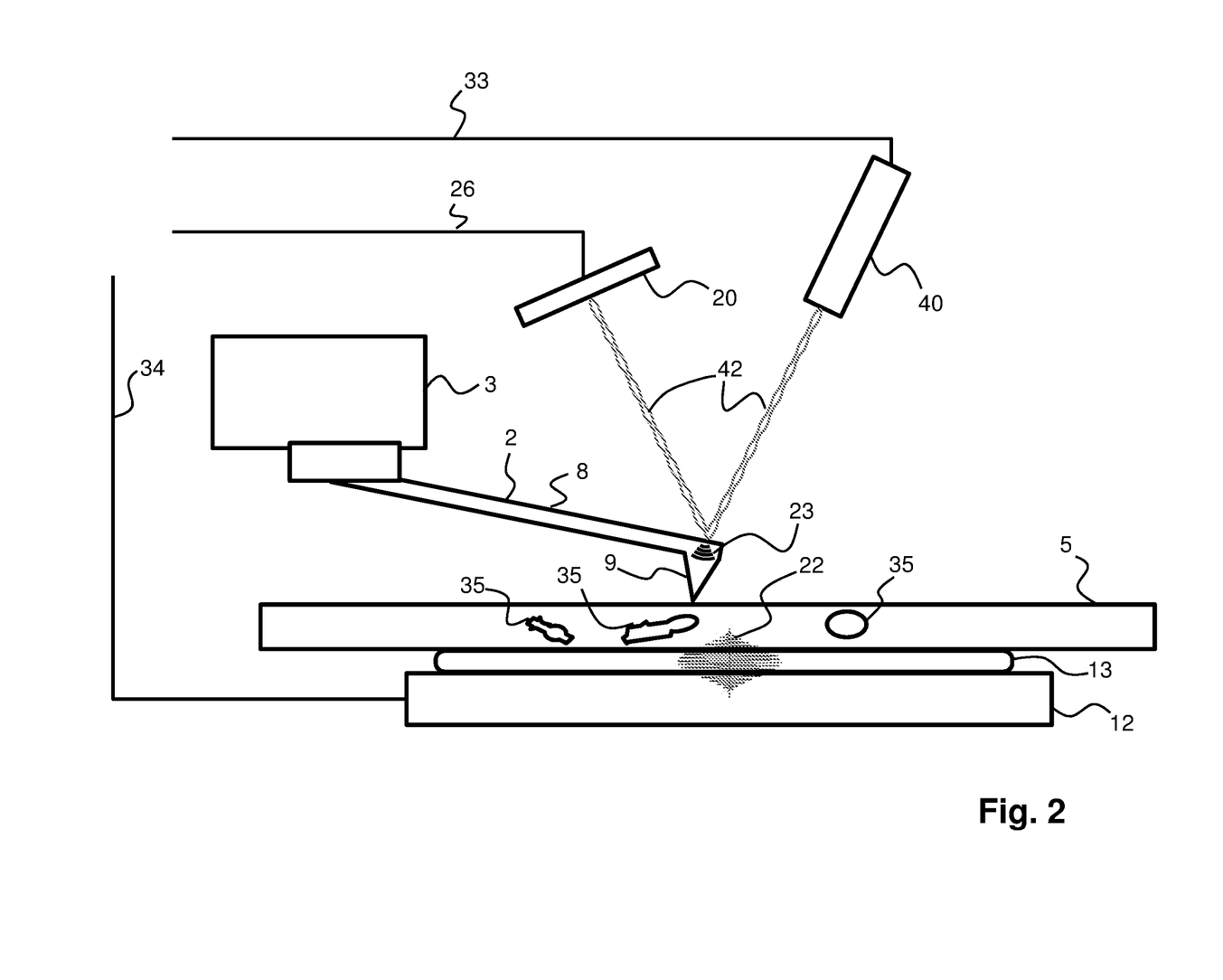
FIG. 2 schematically illustrates a further embodiment of the scanning probe microscopy system in accordance with the present invention.

The acoustic signals may be applied using various different methods. In the embodiment of FIG. 2, the acoustic signal 23 is applied via the probe tip 9, whereas the acoustic signal 22 is applied via the transducer 12 and coupling medium 13 to the sample 5. FIG. 2 also illustrates sub-surface structures 35 (which may of course be of any arbitrary shape, structure, material, or size). In the embodiment of FIG. 2, the first input signal 33 is provided to a pulsed laser source 40. The pulsed laser source 40 provides a intensity varied pulsed laser beam 42. The modulation of the laser beam 42 has a frequency identical to $f_1$ of the input signal 33. Due to the modulation in the laser beam 42, a variable amount of heat is provided to the probe tip 9 continuously, resulting in acoustic vibrations inside the probe tip 9. The acoustic vibrations provide for the acoustic input signal 23 illustrated in FIG. 2. Using the pulsed laser beam 42 enables to generate the acoustic input signal 23 while at the same time allowing detection of the pulsed laser beam 42 at the optical detector 20 such as to obtain the output signal 26 indicative of cantilever or probe tip vibrations. This therefore obviates the need for an additional transducer or other means for applying the acoustic signal 23 for either the probe tip 9 or sample 5. As may be appreciated, although combining the excitation beam for providing the acoustic input signal 23 with the optical sensing beam for determining probe deflection does provide advantages in terms of only requiring one beam for actuation and sensing, this is not required. The skilled person will appreciate that there may be a separate excitation beam and a separate sensing beam.

In addition to the above, it is observed that it is not essential to apply an optical sensing technique to determining probe deflection. In fact any suitable type of probe deflection sensor may be applied. Alternative sensing techniques for example include the application of a piezo-resistive layer, the electrical resistance of which vary with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample. The skilled person will be familiar with such techniques and is able to apply them in embodiments of the present invention.

Figure 3:
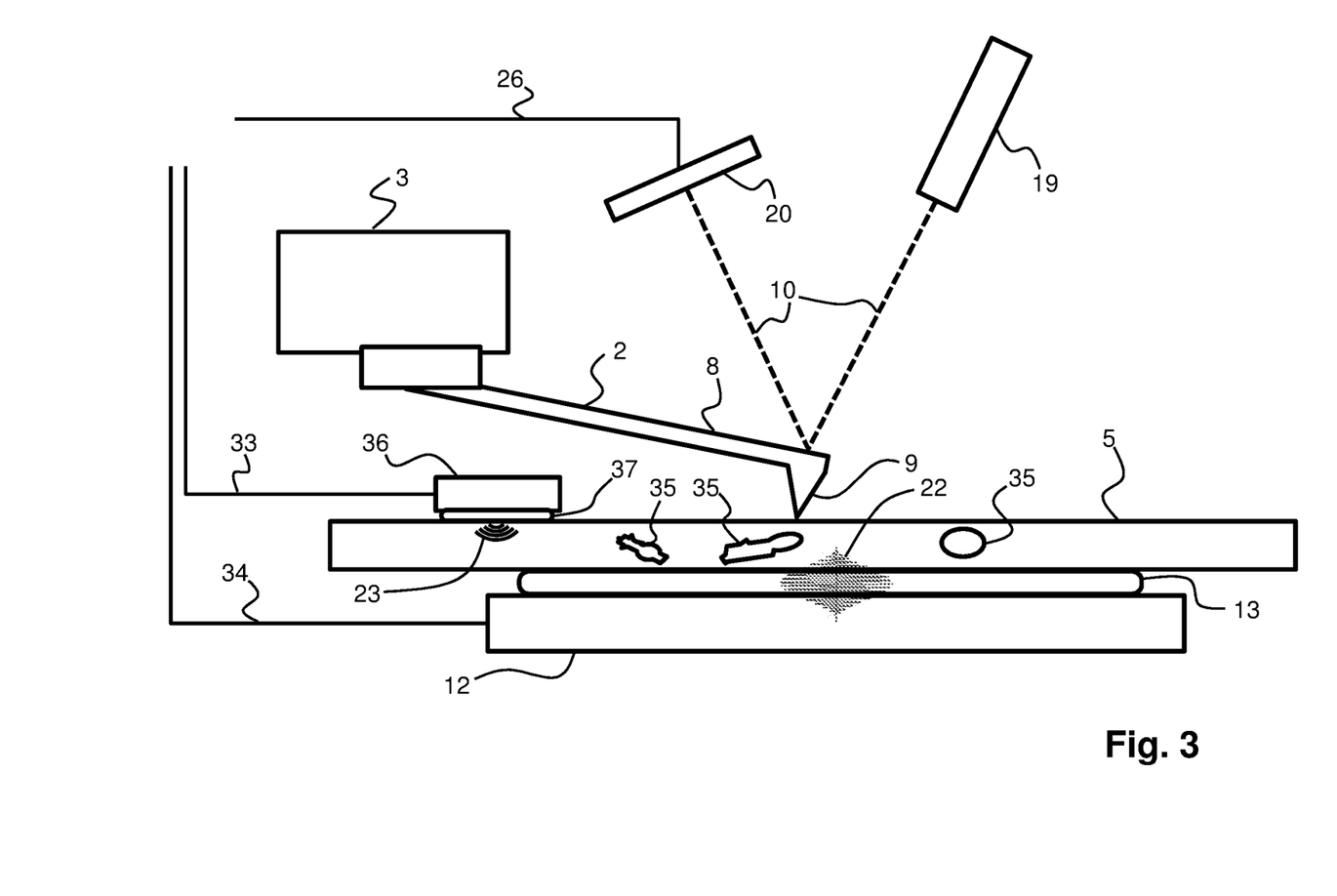
FIG. 3 schematically illustrates a further embodiment of a scanning probe microscopy system in accordance with the present invention.

Yet a further embodiment of the present invention is illustrated in FIG. 3. In the embodiment of FIG. 3, the input signal 23 is via a transducer 36 and an additional coupling medium 37 directly to the sample 5. In the embodiment of FIG. 3, application of the input signal 23 is applied via the transducer 36 from above (i.e. the surface of the sample 5), but the skilled person may appreciate that the acoustic input signal 23 may also be applied from the side of the sample 5 or from underneath the sample 5. Although application of the acoustic input signal 23 via the probe tip 9 in the first and second embodiments of FIGS. 1 and 2 respectively has the advantage that coupling losses for applying the acoustic signal 23 and losses in sensing the signal via the probe tip 9 are reduced to a minimum, the embodiment of FIG. 3 illustrates that it is not an absolute requirement to apply the acoustic input signal 23 via the probe tip. Application of signal 23 via the probe tip 9 is preferred in view of the obtained advantages. In this respect, it is to be noted that sensing acoustic signals in the gigahertz range is problematic in view of the signal losses and coupling losses. The present invention overcomes this by applying the heterodyne approach, and further by applying signal 23 via the probe tip 9 in accordance with some embodiments. To enable the detection of sub-surface structures using acoustic input signals in a frequency range above 1 GHz it is primarily important to obtain a mixed signal that comprises the differential frequency component $f_{diff}$. For this, it is not required to apply the acoustic input signal 23 via the probe tip 9, although application via the probe tip 9 thus provide the advantage that coupling losses for the acoustic signal 23 are reduced to a minimum. On the other hand, the embodiment illustrated in FIG. 3 provides the advantage that the detected optical beam 10 does not comprise a pulsation that may need to be filtered out with a low pass filter. Moreover, the embodiment of FIG. 3 is more cost efficient by not applying a pulsed laser source.

Figure 4:
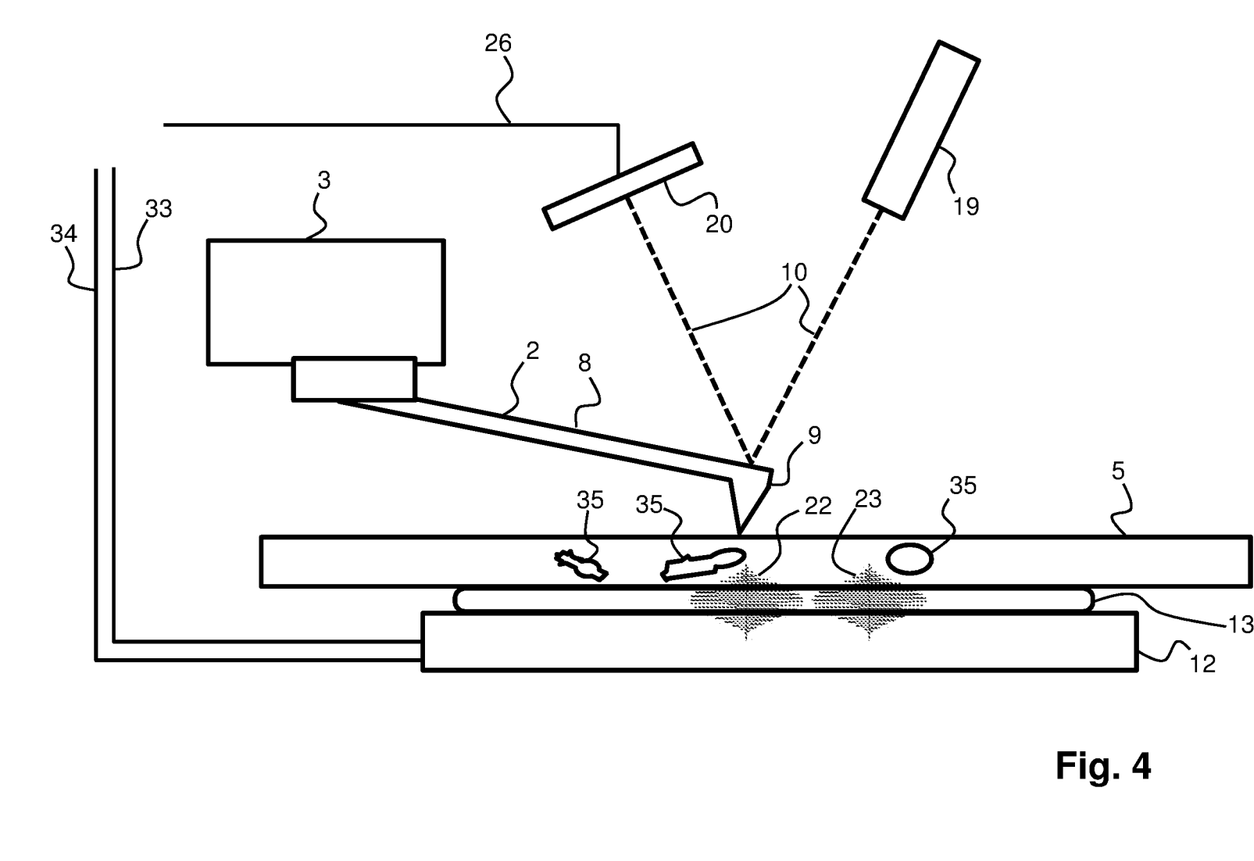
FIG. 4 schematically illustrates a further embodiment of a scanning probe microscopy system in accordance with the present invention.

In yet another embodiment, which is illustrated in FIG. 4, both acoustic input signals 22 and 23 are applied via the transducer 12 underneath the sample 5. Here, the both input signals 33 and 34 are provided to the transducer 12 as is schematically illustrated in FIG. 4. Like in FIG. 3, the created surface waves at the surface of sample 5 may be picked up via the probe tip 9, providing an output signal 26 obtained via the optical detector 20. The embodiment of FIG. 4 has the further advantage of not requiring any further transducers other than the transducer 12 underneath the sample 5.

Figure 5:
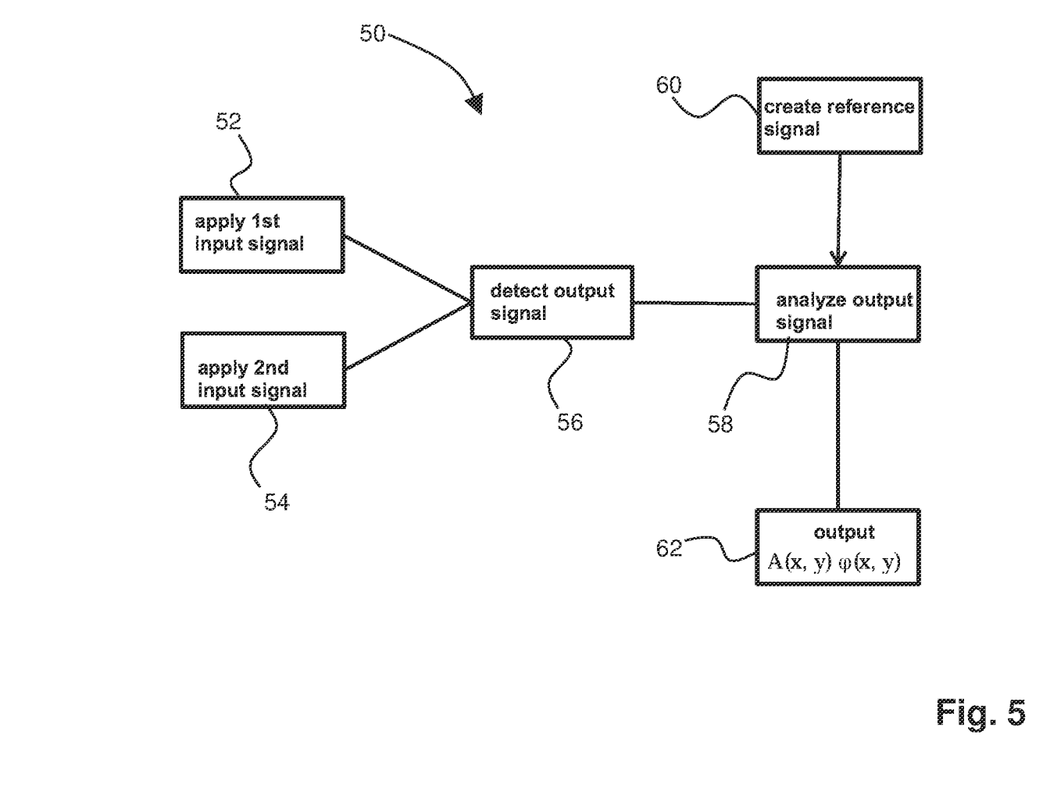
FIG. 5 schematically illustrates a method in accordance with the present invention.

FIG. 5 schematically illustrates a method 50 in accordance with the present invention. The method 50 starts in step 52 with application of an acoustic input signal to the sample. This may for example be performed using the transducer 12 illustrated in FIGS. 1 to 4. Moreover, a further acoustic input signal is applied in step 54. The further acoustic input signal may be applied to the probe tip 9 or directly to the sample using various different means as illustrated in FIGS. 1 to 4 above. For example, the further acoustic input signal may be applied via a further transducer that is coupled to the sample 5 via a coupling medium (e.g. FIG. 3). Alternatively, a pulsed laser source 40, as illustrated in FIG. 2, may be used to create acoustic vibrations in the probe tip 9. However, a probe tip 9 may also be provided with an additional actuator unit that acts as a transducer, such as element 18 in FIG. 1. For example, a probe 2 may be electrostatically actuated by means of applying any of a variety of existing methods. For example, this may be achieved by applying a variable voltage signal to the probe tip 9, while flexibly attaching the probe tip to the cantilever by means of leaf springs. Moreover, step 54 may alternatively be performed by applying the further acoustic input signal via the same transducer as the first acoustic input signal, which is for example illustrated in FIG. 4.

In step 56, an output signal is detected using the detection means of the scanning probe microscopy system. Typically such detection means include a laser beam 10 or 42 that impinges on the cantilever and is received by an optical detector, as is illustrated in FIGS. 1 to 4 above. However, the skilled person will appreciate that other sensor systems are available for scanning probe microscopy systems that may likewise be applied to the present invention. The output signal 56 is provided to an analysis system. Moreover, in step 60 a reference signal 27 is created at the differential frequency $f_{diff}$ which is the difference between the frequency of the first acoustic input signal provided in step 52 and the further acoustic input signal provided in step 54. The reference signal 27 is also provided to the analysis system 30. In step 58, the output signal 26 is analyzed by comparing it with the reference signal 27 received, and from this the amplitude and phase characteristics 37 of the output signal are determined. The amplitude and phase of the output signal are location dependent, and depend on the scanning position of the probe relative to the sample. The step of scanning the probe tip 9 relative to the sample 5 is not illustrated in the method 50 of FIG. 5, but will usually be present to map the amplitude and phase data in a location dependent manner for visualization of the sub-surface structures 35. However, where desired the method of the present invention may also be used to obtain a single value at one location on the surface of the sample or to perform a line scan across one or more lines. It will be appreciated that the step of scanning the probe tip 9 relative to the sample 5 may be performed by any one of moving the probe tip 9 or moving the sample 5, or moving both the probe tip 9 and the sample 5. The invention is not limited to any particular implementation in this respect.

After analyzing the output signal in step 58, the resulting amplitude and phase characteristics 37, together with the location data, are provided in step 62 as the outcome of the method of the present invention.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. For example, any number of additional acoustic input signals may be applied, either to the sample or to the probe tip, without departing from the claimed invention. Also, the present invention may be combined with additional measurement techniques to obtain additional information from the combination of these. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A heterodyne scanning probe microscopy method for imaging structures on or below the surface of a sample, the method including:
    applying, using a transducer and a coupling medium in contact with the sample, an acoustic input signal directly to the sample;
    sensing, using a probe including a probe tip in contact with the surface, an acoustic output signal, wherein the probe and probe tip are different from the coupling medium, and wherein the acoustic output signal is representative of acoustic waves induced by the acoustic input signal that are measurable at the surface;
    wherein the acoustic input signal comprises at least a first signal component having a first frequency above 1 gigahertz,
    wherein, for detecting of the acoustic output signal during the sensing, the method further comprises applying a further acoustic input signal to the probe for obtaining a mixed acoustic signal, the further acoustic input signal including at least a second signal component having a second frequency above 1 gigahertz,
    wherein the mixed acoustic signal comprises a third signal component having a third frequency equal to a difference between the first frequency and the second frequency,
    wherein the third frequency of the third signal component is below 1 gigahertz,
    wherein the further acoustic input signal is applied by inducing acoustic vibrations in the probe tip of the probe, and
    wherein the inducing acoustic vibrations in the probe tip is performed by producing and directing an optical excitation beam to be incident on the probe tip, the optical excitation beam having a time varying optical power at the second frequency above 1 gigahertz for enabling photo thermal excitation of the probe tip for the inducing acoustic vibrations.

2. The heterodyne scanning probe microscopy method according to claim 1, wherein the sensing the acoustic output signal is performed by making an optical sensing beam incident on the probe tip and sensing a reflected beam of the optical sensing beam using an optical sensor.

3. The heterodyne scanning probe microscopy method according to claim 2, wherein the optical sensing beam is produced so as to comprise a time varying optical power, and wherein the optical sensing beam also forms the optical excitation beam for inducing the acoustic vibrations in the probe tip.

4. The heterodyne scanning probe microscopy method according to claim 3, wherein the step of sensing of the acoustic output signal comprises providing a sensor signal using a sensor, and
    wherein the method further comprises:
        analyzing the acoustic input signal with the further acoustic input signal for determining a difference between the first frequency and the second frequency,
        generating a reference signal including a reference signal component having a frequency equal to the difference frequency, and
        analyzing the sensor signal by comparing the sensor signal with the reference signal.

5. The heterodyne scanning probe microscopy method according to claim 2, wherein the step of sensing of the acoustic output signal comprises providing a sensor signal using a sensor, and
    wherein the method further comprises:
        analyzing the acoustic input signal with the further acoustic input signal for determining a difference between the first frequency and the second frequency,
        generating a reference signal including a reference signal component having a frequency equal to the difference frequency, and
        analyzing the sensor signal by comparing the sensor signal with the reference signal.

6. The heterodyne scanning probe microscopy method according to claim 1, wherein the step of sensing of the acoustic output signal comprises providing, using a further sensor, a sensor signal indicative of vibrations of the probe tip or a cantilever upon which the probe tip is mounted, and
    wherein the method further comprises:

analyzing the acoustic input signal with the further acoustic input signal for determining a difference between the first frequency and the second frequency, generating a reference signal including a reference signal component having a fourth frequency equal to the difference frequency, and analyzing the sensor signal by comparing the sensor signal with the reference signal.

7. The heterodyne scanning probe microscopy method according to claim 1, wherein the sensing the acoustic output signal is performed by making an optical sensing beam incident on a cantilever upon which the probe tip is mounted, and sensing a reflected beam of the optical sensing beam using an optical sensor.

8. A scanning probe microscopy system for imaging structures on or below the surface of a sample, the system comprising:

a probe for scanning the sample surface, wherein the probe comprises a probe tip mounted on a cantilever, and wherein the probe is mounted on a sensing head arranged for bringing the probe tip in contact with the sampling surface;

a motion actuator for enabling motion of the probe relative to the sample;

a transducer for applying, using a coupling medium and contacting the sample, an acoustic input signal directly to the sample, wherein the coupling medium is different from the probe and the probe tip; and a probe deflection sensor for producing a sensor signal indicative of an acoustic output signal received via the probe tip, wherein the acoustic output signal is representative of acoustic waves induced by the acoustic input signal, wherein the transducer is arranged for producing the acoustic input signal so as to comprise at least a first signal component having a first frequency above 1 gigahertz, wherein the system is further configured for applying a further acoustic input signal to the probe for obtaining a mixed acoustic signal, the further acoustic input signal including at least a second signal component having a second frequency above 1 gigahertz, wherein the mixed acoustic signal comprises a third signal component having a third frequency equal to a difference between the first frequency and the second frequency, wherein the third frequency of the third signal component is below 1 gigahertz, wherein the system is configured for applying the further acoustic input signal by inducing acoustic vibrations in the probe tip of the probe, and wherein the system comprises an optical excitation source configured for producing and directing an optical excitation beam to be incident on the probe tip, the optical excitation source being configured for producing the optical excitation beam having a time varying optical power at the second frequency above 1 gigahertz for enabling photo thermal excitation of the probe tip for the inducing acoustic vibrations.

9. The scanning probe microscopy system according to claim 8, wherein the probe deflection sensor comprises:

an optical source arranged for producing an optical sensing beam and for directing the optical sensing beam to the probe tip, and an optical sensor arranged for receiving a reflected beam obtained by reflection of the optical sensing beam by the probe tip.

10. The scanning probe microscopy system according to claim 9, wherein the optical source that is configured for producing the optical sensing beam is further configured for producing the optical sensing beam so as to comprise a time varying optical power, for enabling the optical sensing beam to be used as the optical excitation beam for inducing the acoustic vibrations in the probe tip.

11. The scanning probe microscopy system according to claim 10, the system further comprising an analyzer arranged for analyzing the sensor signal by comparing the sensor signal with a reference signal, wherein the analyzer is configured for receiving a first input signal representing the acoustic input signal and a second input signal representing the further acoustic input signal, and wherein the analyzer is configured for analyzing the first input signal and the second input signal for determining a difference between the first frequency and the second frequency and generating the reference signal including a reference signal component having a frequency equal to the difference frequency.

12. The scanning probe microscopy system according to claim 9, the system further comprising an analyzer arranged for analyzing the sensor signal by comparing the sensor signal with a reference signal, wherein the analyzer is configured for receiving a first input signal representing the acoustic input signal and a second input signal representing the further acoustic input signal, and wherein the analyzer is configured for analyzing the first input signal and the second input signal for determining a difference between the first frequency and the second frequency and generating the reference signal including a reference signal component having a frequency equal to the difference frequency.

13. The scanning probe microscopy system according to claim 8, the system further comprising an analyzer arranged for analyzing the sensor signal by comparing the sensor signal with a reference signal, wherein the analyzer is configured for receiving a first input signal representing the acoustic input signal and a second input signal representing the further acoustic input signal, and wherein the analyzer is configured for analyzing the first input signal and the second input signal for determining a difference between the first frequency and the second frequency and generating the reference signal including a reference signal component having a fourth frequency equal to the difference frequency.

14. The scanning probe microscopy system according to claim 8, wherein the probe deflection sensor comprises:

an optical source arranged for producing an optical sensing beam and for directing the optical sensing beam to the cantilever, and an optical sensor arranged for receiving a reflected beam obtained by reflection of the optical sensing beam by the cantilever.

* * * * *